United States Patent [19]

Rumph et al.

[11] Patent Number: 4,956,959
[45] Date of Patent: Sep. 18, 1990

[54] HOUSING FOR HOLDING A SUPPLY ROLL OF LARGE ROUND BALE WRAP MATERIAL

[75] Inventors: George W. Rumph, Bloomfield; Henry D. Anstey, Ottumwa, both of Iowa

[73] Assignee: Deere & Company, Moline, Ill.

[21] Appl. No.: 370,552

[22] Filed: Jun. 23, 1989

[51] Int. Cl.$^5$ ............... B65B 11/30; B65B 27/12; B65H 19/00
[52] U.S. Cl. ............... 53/118; 53/389; 53/587; 56/391; 100/5; 242/55; 242/53
[58] Field of Search ............ 53/118, 389, 587; 56/391; 100/5, 88; 242/55.2, 55.53

[56] References Cited

U.S. PATENT DOCUMENTS

| | | | |
|---|---|---|---|
| 1,026,128 | 5/1912 | Rydquist | 242/55.2 |
| 2,487,763 | 11/1949 | Patterson et al. | 242/55.53 |
| 3,007,651 | 11/1961 | Palmore | 242/55.53 |
| 3,729,145 | 4/1973 | Koo et al. | 242/55.53 |
| 3,731,318 | 5/1973 | Dickey | 242/55.53 X |
| 4,353,511 | 10/1982 | Shimizu | 242/55.53 |
| 4,444,359 | 4/1984 | Butler | 242/55.53 |
| 4,691,503 | 9/1987 | Frerich | 53/587 |

Primary Examiner—Robert L. Spruill
Assistant Examiner—Beth Bianca

[57] ABSTRACT

A mechanism for enveloping a large round bale with a surface wrap material such as plastic sheet or net includes a housing for holding a supply roll of the wrap material. The mechanism and, hence, the housing is mounted on the rear of a bale discharge gate. The housing includes a front wall, defined by an upright secured across the rear of the gate, and a bottom wall sloped upwardly and rearwardly relative to the front wall. The bottom wall and front wall converge toward a wrap material passage defined between a forward edge of the bottom wall and the front wall. A wrap material loading arm is vertically pivotally mounted to the support walls at locations adjacent the rear end of the bottom wall, the arm being shaped so as to be able to receive and cradle a supply roll in a relatively low position for ease in loading and for having a length of material pulled therefrom and placed around the forward part of a spreader roll of the material feed mechanism, when the arm is in a lowered roll-receiving position, and so as to deposit the cradled roll onto the bottom wall when the arm is lifted to a raised position.

11 Claims, 3 Drawing Sheets

HOUSING FOR HOLDING A SUPPLY ROLL OF LARGE ROUND BALE WRAP MATERIAL

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

BACKGROUND OF THE INVENTION

The present invention relates to a mechanism for enveloping large round bales, formed in a bale-forming chamber, with a wrap material such as plastic sheet or net and more particularly relates to a housing for holding a supply of such wrap material in a position for being fed into the bale-forming chamber.

U.S. Pat. No. 4,691,503, granted to Josef Frerich on Sept. 8, 1987, discloses a surface wrap housing structure, of the type described above, mounted on the rear of a round baler discharge gate and being substantially enclosed except for an open front which is closed by a panel mounted transversely across the rear of the gate. The housing is vertically pivotally mounted for swinging away from the gate to a lowered position disposing its open front at a height approximating that of the bed of a pickup truck or wagon so that rolls of wrap material carried on such a bed may be loaded into the housing without the need for lifting the relatively heavy rolls of wrap material through any great distance. Also, a spreader roll is rotatably supported from legs which depend from a forward portion of the housing when the latter is in its raised, operative position. Once the roll of wrap material is placed in the lowered housing, a length of material may be pulled from the latter and threaded about the spreader roll and inserted into the nip of a pair of feed rolls. The housing may then be raised to position the roll for use in wrapping bales formed in the bale-forming chamber. While this structure provides for easy loading of wrap material rolls into the housing and threading of the wrap feed mechanism, the housing is somewhat expensive to fabricate as an integral piece and substantial clearance must be provided for permitting the suspended spreader roll to pivot with the housing.

SUMMARY OF THE INVENTION

According to the present invention, there is provided an improved housing for holding a supply roll of surface wrap material for large round bales, and, more particularly, there is provided a housing incorporating a wrap material roll loading structure which represents an improvement over the structure disclosed in the above-mentioned patent.

An object of the invention is to provide a surface wrap housing incorporating a simply constructed wrap material roll loading structure for lifting and loading a roll onto a support wall of the housing.

Another object of the invention is to provide a wrap material roll loading structure, as mentioned above, which is shaped for cradling a roll of material when the arm is in a lowered roll-receiving position so as to facilitate the threading of the material across the front of a material spreader roll, mounted in place below the housing, with the completion of threading by inserting the wrap into the nip of a pair of feed rolls being done once the arm is raised.

A more specific object of the invention is to provide a surface wrap housing incorporating a wrap material roll loading arm that is vertically pivotally mounted for movement between a lowered, roll receiving position and a raised, roll depositing position wherein it deposits a roll on a bottom wall or floor of the housing.

Still a more specific object of the invention is to provide a wrap material roll loading arm, as described above, which is constructed of a formed rod having transversely spaced apart leg portions shaped arcuately about a radius approximating that of a complete roll of wrap material, the legs each having an out-turned end pivotally received in an aperture for establishing the pivot axis of the arm and being joined together, at a location remote from these ends, by a transverse, handle-forming portion.

These and other objects will become apparent from a reading of the ensuing description together with the appended drawings.

DESCRIPTION OF THE PREFERRED EMBODIMENT

Figure 1:
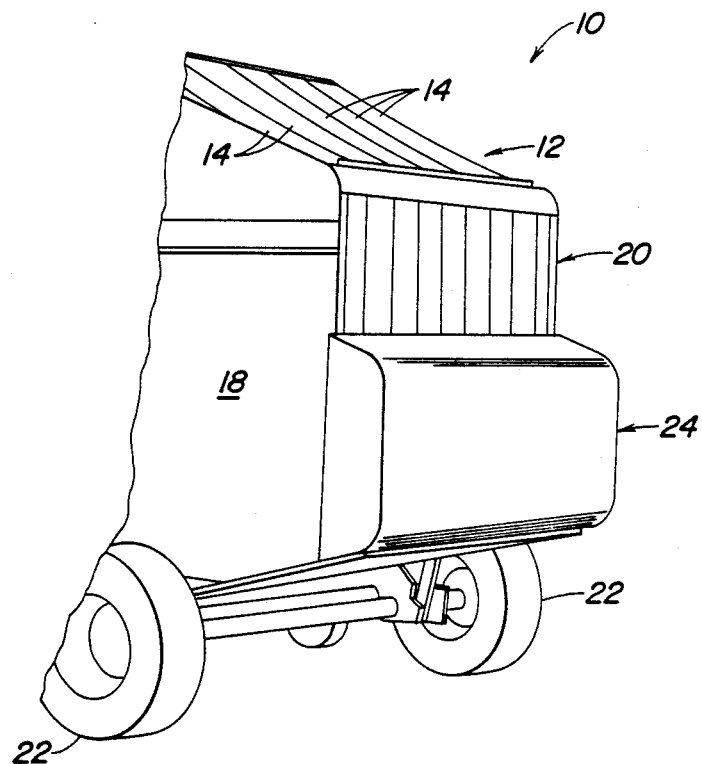
FIG. 1 is a left rear perspective view of the rear portion of a large round baler equipped with a surface wrap material supply roll housing constructed in accordance with the principles of the present invention.
Figure 2:
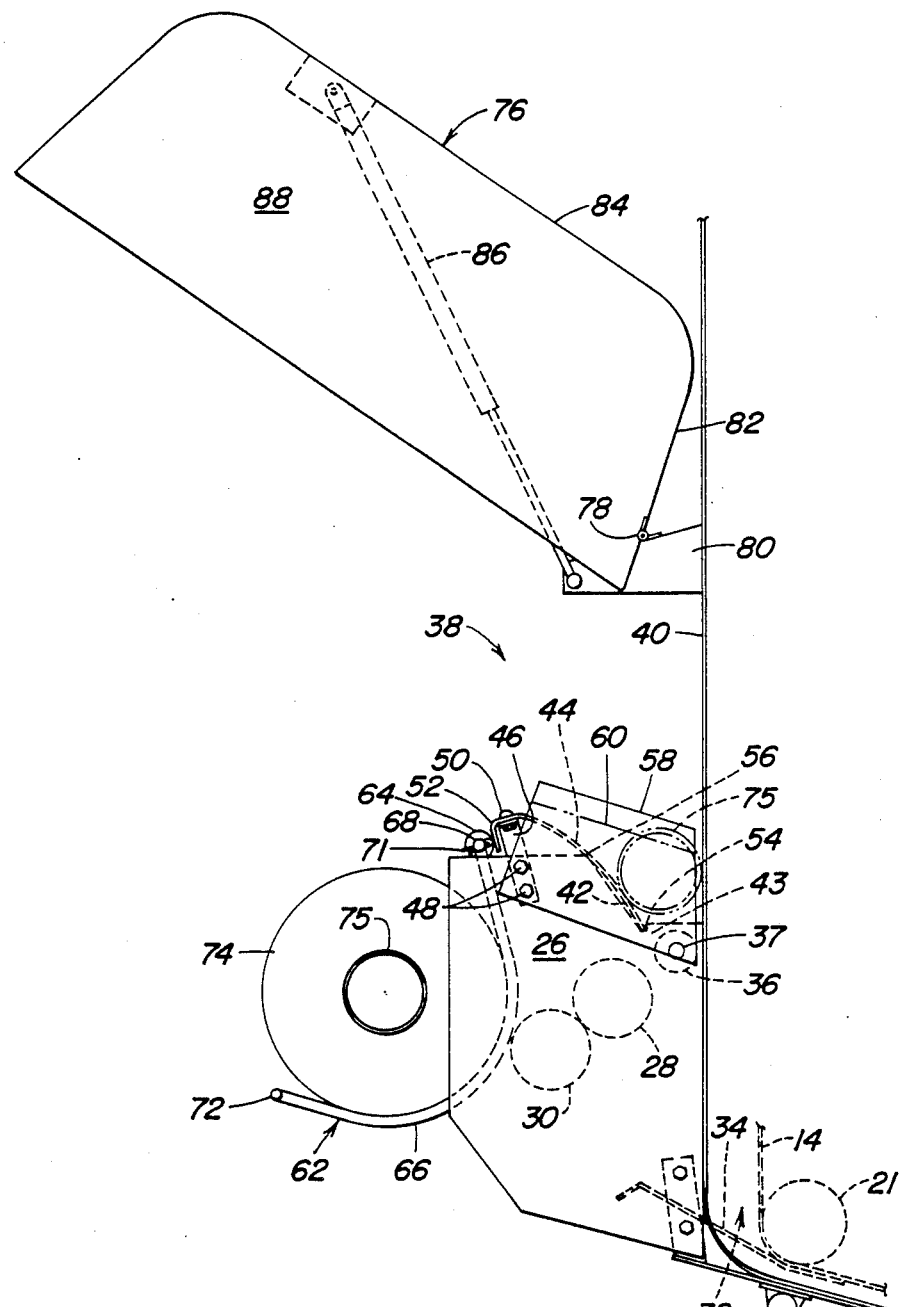
FIG. 2 is a right side elevational view showing the wrap material supply roll housing showing the housing cover in an upwardly pivoted, open position, showing the housing cover in an upwardly pivoted open position, showing the supply roll lading bail or arm in a downwardly pivoted, roll loading position and showing a core of a depleted roll resting on a lower forward end portion of the curved bottom of the housing.
Figure 3:
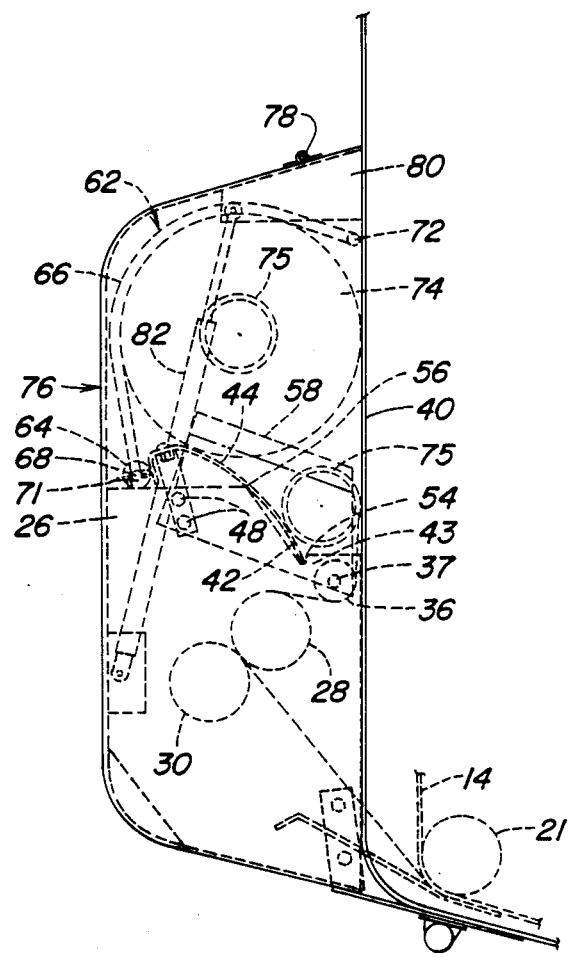
FIG. 3 is a view similar to that of FIG. 2 but showing the supply roll loading arm in an upwardly pivoted, roll deposit position and showing a full roll of wrap material that has been deposited on an upper rearward end of the curved bottom wall of the housing.

Referring now to FIG. 1, there is shown a rear portion of a large round baler 10 of a type including an expansible bale-forming chamber 12 formed in part by opposite sidewalls 18 of a bale discharge gate 20, these walls supporting a second set of belt support rolls including a lower rear roll 21 (FIGS. 2 and 3). A pair of ground wheels 22 support the baler for being towed over the ground by a tractor.

Referring now also to FIGS. 2 and 3, a bale wrapping mechanism 24 includes opposite support walls 26 having forward, upright, transverse flanges bolted to similar flanges formed at the respective rear ends of the gate sidewalls 18. Extending between and having their opposite ends rotatably mounted in the support walls 26 are a pair of wrap material feed rolls 28 and 30, with the roll 28 being disposed above and forwardly of the roll 30 such that a material flight path, defined by a plane located tangentially to the rolls at their bite or nip, extends substantially into a bite or nip area 32 defined by a guide pan portion 34 and a portion of the belts 14 engaged with the lower rear support roll 21 carried by the gate 20. Located forwardly and above the upper feed roll 28 is a spreader roll 36 having its opposite ends rotatably supported by respective bearings (not shown) mounted in an upper forward location of the support walls 26 by respective bolts 37, the roll 36 carrying spiral flights (not shown) at its opposite ends with the flights being of opposite hand so as to spread wrap material engaged therewith to the full width of the spreader roll.

The bale wrap mechanism 24 includes a supply roll housing 38 having a front wall 40 defined by a vertical panel extending between and bolted to the rear ends of the gate sidewalls 18. The housing 38 further includes a downwardly and forwardly extending bottom wall 42, the bottom wall 42 and the front wall 40 converging toward a wrap material passage 43 defined between a forward edge of the wall 42 and the wall 40. The bottom wall 42 has an upper surface 44 curved convexly from front to rear with the curvature being specially selected to cooperate with the front wall so as to frictionally engage a roll of wrap material in a manner and for a purpose explained in more detail below. A pair of L-shaped straps 46 having out-turned upper ends are respectively secured to upper rear portions of the support walls 26 by a pair of spaced bolts 48. Upper rear locations of the curved housing bottom wall 42 overlie and are bolted, as at 50, to the out-turned ends of the straps 46. It is here noted that the rear end of the bottom wall 42 is bent downwardly so as to form a rounded corner 52 for engagement by a new supply roll of wrap material being loaded into the housing, in a manner described below. The wall 42 has its forward end captively engaged in respective notches or recesses 54 provided in upper forward locations of the support walls 26. A third point of support for the bottom wall 42 is provided by respective corners 56 defined at respective intermediate locations along upper edges of the walls 26. A roll of wrap material resting on the bottom wall 42 has its sideways movement limited by opposite containment plates 58, each being mounted to the support walls 26 by the pair of bolts 48 and by the bolt 37. The upper portion of each of the containment plates 58 is bent outwardly, as at 60, so that a rounded corner will be presented to the ends of the roll of wrap material being contained by the plates.

A wrap material roll loading bail or arm 62 is vertically pivotally mounted to upper rear locations of the support walls 26. Specifically, welded to respective upper edges of the walls 26 and defining a horizontal pivot axis are a pair of transversely aligned washers 64. The arm 62 is defined by a rod formed so as to define opposite legs 66 curved arcuately at a radius approximating that of a complete roll of wrap material, the legs terminating at respective out-turned ends 68 received in the washers 64 and provided with respective holes receiving containment pins 70. The ends of the legs 66 opposite the out-turned ends are joined together by a transverse section which serves as a handle 72. When the loading arm 62 is in a lowered, roll receiving position as shown in FIG. 2, the curved legs 66 will be disposed at a relatively low height for having a roll of wrap material 74, including a tubular core 75 made of cardboard or the like, placed thereon either from the ground or preferably from a truck or wagon bed or the like so as to minimize or eliminate the need for lifting the roll, it being noted that a complete roll may weigh from 75–80 pounds. Once the roll 74 is cradled by the arcuate legs 66, a length of wrap material can be pulled from the roll and threaded into the feed mechanism by first placing the material around the front portion of the spreader roll 36, the loading arm 62 then being raised to deposit the roll of wrap onto the bottom wall surface 44 and then the threading operation being completed by inserting the material into the nip of the feed rolls 28 and 30. The fact that only the legs 66 of the arm 62 are in contact with the cradled supply roll 74 is important since the frictional drag imposed on the roll as the latter unrolls when material is pulled therefrom is relatively small. It is to be noted that the arm 62 is structured about its pivot axis such that the maximum lifting force needed to lift the roll is about one-half the roll weight and, that once the arm is in its roll deposit position it will remain there due to the action of gravity. In any event, a cover 76, here shown in an upwardly pivoted open position, may be lowered about respective pivot connections 78, its upper forward corners have with angle brackets 80 bolted to the rear edges of the gate walls 18, to a closed position wherein top and rear walls 82 and 84, respectively, of the cover will be proximate the arm so as to prevent it from moving from its raised position. It is here noted that a pair of gas springs 86 are connected between respective brackets carried at lower rear locations of opposite sidewalls 88 of the cover 76 and the brackets 80 such that the springs are moved over center as the cover is moved between its open and closed positions and thus act to bias the cover to its open position when it is open and to it closed position when it is closed.

The operation of the wrap material supply roll lift arm or bail 62 is thought to be clear from the description above and will not be reiterated for the sake of brevity.

We claim:

1. In a large round baler including a bale-forming chamber defined in part by a bale discharge gate, a support structure connected to a lower rear portion of the bale discharge gate, a bale wrapping mechanism mounted to the support structure and including a wrap material supply roll housing adapted for holding a supply roll from which wrap material may be pulled during wrapping of a bale formed in the chamber, the improvement comprising: said housing having a bottom wall extending transversely behind said discharge gate having an upwardly facing roll support surface extending between front and rear ends of the bottom wall and being fixed to said support structure; and a roll loading arm being vertically pivotally mounted directly to said support structure for rotation about a horizontal transverse axis located adjacent a rear end portion of the support surface, said arm being shaped to form cradle means for receiving and supporting a roll of wrap material at a level below said pivot axis, when the arm is in a lowered loading position, and for depositing a cradled roll of wrap material onto the support surface when the arm is pivoted from its loading position to a raised discharge position.

2. A large round baler as defined in claim 1 wherein said arm includes a pair of spaced transversely spaced apart, parallel legs; and each of said legs being arcuately shaped to define said cradle means.

3. A large round baler as defined in claim 1 wherein said support surface is inclined downwardly and forwardly and said rear end of the bottom wall is bent downwardly so as to form a rounded surface joined to said support surface and said loading arm being so disposed relative to said rounded surface that a supply roll cradled by said loading arm comes into contact with said rounded surface as the arm is swung from its loading position to its discharge position for depositing such roll on said support surface.

4. A large round baler as defined in claim 1 wherein said arm is configured such that it extends over the top of a roll of wrap material resting on the support surface when the arm is in its raised position and such that the center of gravity of the arm is over center relative to said pivot axis, whereby gravity keeps the arm in its raised position.

5. A large round baler as defined in claim 4 wherein said housing further includes a cover having, as considered in a lowered closed position, transversely spaced sidewalls joined together by top, bottom and rear walls arranged for enclosing the raised arm and the bottom wall, with the top and rear walls being disposed close to the arm; and connection means connecting an upper forward location of said cover to said support and establishing a second horizontal pivot axis about which said cover is upwardly and rearwardly swingable from its closed position to a raised open position permitting said arm to be accessed and lowered.

6. A large round baler as defined in claim 2 wherein said cradle means further includes a transverse arm portion interconnecting said arcuately shaped legs at a location remote from said pivot axis and being located outwardly relative to an arcuately curved extension of said legs for serving as a handle.

7. A large round baler as defined in claim 2 wherein said arm is defined in its entirety by a formed rod including transversely spaced portions forming said legs and a transverse portion interconnecting said legs and forming a handle at a location remote from said pivot axis.

8. A large round baler as defined in claim 7 wherein said support includes a pair of transversely spaced support walls including upper rear edge portions disposed below said pivot axis; a pair of washers respectively welded to said upper rear edge portions with respective holes of the washers being aligned with each other along said axis; and said legs having out-turned end portions respectively received in said pair of washers.

9. A large round baler as defined in claim 7 wherein the distance between said handle and said pivot axis is such as to result in approximately a two-to-one lifting advantage when the arm is in its lowered position.

10. A large round baler as defined in claim 2 wherein said wrapping mechanism includes a feed means; and said legs being shaped so as to have a relatively small surface area in contact with a roll of material cradled thereby, whereby a length of material may be easily pulled from such a cradled roll so as to permit at least the initial steps of threading the material into the feed means to be performed.

11. A large round baler as defined in claim 10 wherein said legs are defined by a rod.

* * * * *